United States Patent

[11] 3,620,327

[72] Inventor Carl H. Savit
 Houston, Tex.
[21] Appl. No. 825,380
[22] Filed May 16, 1969
[45] Patented Nov. 16, 1971
[73] Assignee Western Geophysical Company of America
 Houston, Tex.

[54] LOW-FREQUENCY GAS EXPLODER
 5 Claims, 4 Drawing Figs.
[52] U.S. Cl. ........................................................ 181/.5 NC
[51] Int. Cl. ........................................................ G01v 1/00
[50] Field of Search ........................................... 181/.5 IC,
 .5 NC; 340/12

[56] References Cited
UNITED STATES PATENTS
3,176,787 4/1965 Roever ......................... 181/.5 IC
3,480,101 11/1965 Barry et al. ................... 181/.5 IC Primary Examiner—Rodney D. Bennett, Jr.
Assistant Examiner—Brian L. Ribando
Attorneys—Michael P. Breston, Alan C. Rose and Alfred B. Levine ABSTRACT: A marine seismic wave generator is provided for generating acoustic impulses into a body of water. The generator includes a housing having an expansible combustion chamber in communication with the surrounding water. A core is provided in the combustion chamber. The combustion chamber periodically receives a charge of combustible fluid. The detonation of the charge causes the chamber to expand and to transmit to the surrounding water relatively high-energy, low-frequency seismic impulses.

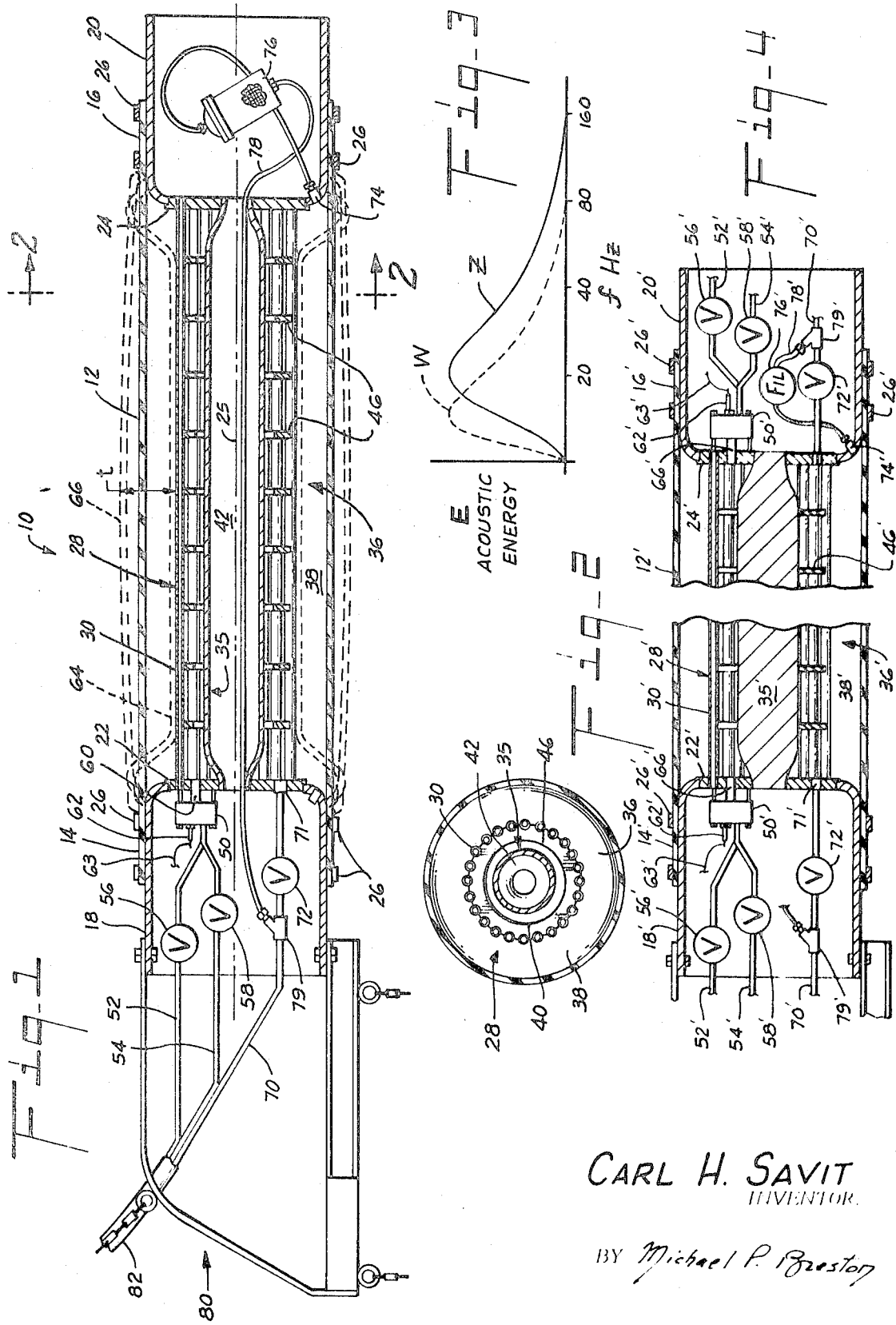

3,620,327

LOW-FREQUENCY GAS EXPLODER

BACKGROUND OF THE INVENTION

Gas exploders are now extensively employed for conducting marine seismic explorations. One such gas exploder known in the art is the AQUAPULSE seismic source (trademark of assignee). Such a source includes an elastic, inflatable cylindrical sleeve or boot coupled to the outlet of a combustion chamber assembly. A plurality of relatively small-diameter metallic tubes are arranged to form a "cylindrical grid" concentric with the boot. The tubes allow water to flow therethrough during movement of the exploder through the water body under seismic investigation. The combustion chamber periodically receives a combustible gas mixture which when ignited causes the inflation of the sleeve and the consequent production of an acoustic impulse. Suitable vent means couple the combustion chamber to a system outwardly of the water body there preventing the generation of undesirable bubble pulses. The gas exploder of the foregoing type, which is described in copending patent application Ser. No. 780,082, assigned to the same assignee, has met with considerable commercial success.

While this invention in its broadest aspects can find utility in gas exploders generally, it has particular utility however to AQUAPULSE seismic sources.

SUMMARY OF THE INVENTION

The exploder includes a housing and an elastic wall preferably in cylindrical form. A core is provided in a combustion chamber which is covered by the elastic wall. A charge of a combustible fluid mixture is periodically admitted into the combustion chamber to abruptly displace the elastic wall against the surrounding ambient pressure thereby producing a seismic impulse.

In one preferred embodiment, the core is a hollow conduit constructed of a metallic material extending through the combustion chamber to allow water to flow through the core when the exploder is moving through the body of water. A plurality of spaced-apart metallic tubes disposed longitudinally at an equal distance from and parallel to the longitudinal axis of the exploder are arranged to form a cylindrical grid.

In another embodiment the center core is made solid and the water circulation takes place only through the metallic tubes.

By suitable selecting the outside diameter of the center core and the inside diameter of the cylindrical sleeve, it is possible to control the ratio of radiating surface area to combustion chamber volume.

The main objects of this invention are: to provide is gas exploders, means to control and increase the output of low-frequency energy, to obtain more useful output acoustic energy from each unit volume of input fuel, to improve the structural characteristics of the exploder, to improve the towing properties of the exploder, to allow double-ended ignition and exhaust, and to allow the designer to determine or control the ratio of radiating surface area to combustion chamber volume.

BRIEF DESCRIPTION OF THE DRAWINGS

FIG. 1 shows a preferred embodiment of the improved gas exploder of this invention partly in cross section;
FIG. 2 is a sectional view taken along line 2—2 in FIG. 1;
FIG. 3 is an energy versus frequency plot; and
FIG. 4 is a sectional view of a modified embodiment.

Referring now to the drawings, wherein like reference characters are used to designate like parts throughout the views, the invention will be illustrated in connection with a preferred embodiment of a marine seismic gas exploder, generally designated as 10.

Exploder 10 includes an elastic, inflatable sleeve or boot 12 made of a suitable rubber material. The sleeve's free ends 14 and 16 are respectively secured to U-shaped end members 18 and 20 made of metal. Members 18 and 20 have flat wall portions 22, 24 disposed substantially perpendicularly to the longitudinal axis 25 of exploder 10. Sleeve 12 is fastened to end members 18 and 20 by suitable clamps 26.

To prevent sleeve 12 from flattening after each detonation and to protect it from heat damage, there is provided a cylindrical grid or cage 28 which includes a plurality of metallic tubes 30. Tubes 30 are disposed in spaced-apart relationship equally distant from and parallel to the longitudinal axis 25. Tubes 30 are of relatively small diameter and the intertubular spacings are not wide enough to allow sleeve 12 to penetrate between the tubes when sleeve 12 is in its "collapsed" condition against cage 28. This condition is caused by the surrounding hydrostatic pressure subsequent to the decrease of the high pressure produced by the internal gas combustion. Being made of metal tubes 30 are thermally conductive. The flow of water through tubes 30 when exploder 10 is moved, cools the metal and prevents heat damage to the rubber boot 12.

The elements thus far described are known, as shown, for example, in said copending patent application. In the known AQUAPULSE exploder, there is also provided, a bell-shaped ignition chamber (not shown) positioned externally of flat wall 22. A combustible mixture of gases fills both the ignition chamber and the inner volume of cage 28 through a suitable outlet from the ignition chamber. One or more spark plugs are mounted externally of the ignition chamber to ignite the combustible mixture inside the ignition chamber. The resulting very high, pressure rise and the expanded products of combustion abruptly inflate sleeve 12. Sleeve 12 acts as an energy-radiating surface to the surrounding water and produces for each detonation a steep acoustic pulse useful for seismic exploration.

In the known exploder as described in said copending patent application, the pressure rise in the ignition chamber itself does not significantly contribute to the useful acoustic pulse since the wall of the ignition chamber is not elastic. Thus, the relatively large ignition chamber reduces the efficiency of the exploder, i.e., less useful seismic output energy is obtained per unit volume of fuel consumed. In addition, this ignition chamber also impairs the towing characteristics of the known exploder.

In sum, the known exploder energy source acts as a radiator of acoustic energy. Since the linear dimension of the exploder is relatively small compared to a wavelength at the operating frequency, acoustic energy transfer to the surrounding water medium is approximately proportional to the square of the area ($A^2$) of the radiating surface, which surface is the unclamped outer cylindrical surface of sleeve 12. The function of sleeve 12 is much like that of a diaphragm of a loud speaker.

In accordance with the present invention, it is possible to provide larger radiating surfaces in exploder units. Such units have significantly improved acoustic impedance matching characteristics with the surrounding water medium. Moreover, since the dominant frequency of energy produced is substantially inversely proportional to the linear dimension of exploder 10, it is now possible in accordance with this invention to generate relatively low-frequency seismic impulses by increasing the size of exploder 10 without a concomitant increase in fuel consumption.

In accordance with a preferred embodiment of this invention there is provided a center, hollow core, generally designated as 35 which extends between and is supported by the end walls 22 and 24. To maintain the symmetry of construction, core 35 is cylindrical throughout its length except for its end portions which may be funneled to provide additional space on the end walls 22 and 24 useful for mounting accessory parts.

For ease of understanding the subsequent description of operation of exploder 10 of this invention, the total inside volume of sleeve 12 is generally designated as 36. Volume 36 may be conveniently subdivided into: volume 38 between the inner cylindrical wall of sleeve 12 and cage 28, volume 40 between the outer wall of core 35 and cage 28, and volume 42 inside the hollow core 35. To structurally support the tubes 30 in the form of the cylindrical grid or cage 28, a plurality of spaced-apart annular serrated spacers 46 are disposed along the longitudinal axis 25. The end walls 22 and 24 support tubes 30 and spacers 46. Since sleeve 12 in its collapsed condition is adjacent to and totally surrounds cage 28, as shown by the dotted lines 64, the volume inside boot 12 now available for the combustible mixture of gases to enter is the volume between the outer surface of core 35 and the inner surface of the wall of collapsed sleeve 12. This volume was previously designated as volume 40 and hereinafter will be referred to as the combustion chamber.

Coupled to the end wall 22 is a suitable mixing chamber 50 which receives fuel and oxidizer gases, for example propane and oxygen, supplied by lines 52, 54 through suitable regulating valves 56, 58 respectively. Mixing chamber 50 allows the oxygen and propane gases to become thoroughly mixed. From mixing chamber 50 an outlet port 60 extending through an opening in end wall 22 allows the thoroughly mixed combustible gas mixture to enter and fill combustion chamber 40. For each seismic "shot" the pressure and volume of the admitted combustible gas mixture is predetermined.

A suitable ignition device such as a spark plug 62 is conveniently mounted in a wall of mixing chamber 50. An electrical ignition pulse is transmitted from the deck of the seismic boat (not shown) through a cable 63. After the end of the filling period, the combustible gas mixture is detonated by spark plug 62. The detonation produces an expansion of the gases in combustion chamber 40 which expansion is accompanied by a steep pressure increase. The rubber boot 12 becomes inflated and stretched outwardly against the surrounding hydrostatic pressure. The stretched position of sleeve 12 is shown by the dotted lines 66. The nearly instantaneous expansion of sleeve 12 transmits a sharp acoustic pulse into the surrounding water medium. Thus, a portion of the energy generated by the combustion of the fuel is transformed by exploder 10 into useful acoustic energy.

The products of combustion are vented from the combustion chamber 40 to a point above the water surface through a vent line 70 coupled between an outlet 71 in wall 22 and a suitable vacuum reservoir on board ship. A solenoid-operated pilot valve 72 controls the opening of the vent line 70.

Whereas the gaseous products of combustion are vented through line 70, the liquid products of combustion are drained out of combustion chamber 40 through a drain plug 74. Solid particles from the drained liquids are removed by a filter 76. An atomizing line 78 couples filter 76 through a nozzle 79 which breaks up the column of water in line 78 into water mist which is lifted by the flow of gases in line 70 to the vacuum reservoir from which they are drained. The vacuum-operated gas exhaust system is described and claimed in said copending patent application. The liquid draining system is described and claimed in U.S. Pat. No. 3,509,962 assigned to the same assignee. A suitable harness generally designated as 80 is secured to front end member 18. Harness 80 is attached to a towing cable 82. A counterweight not shown is secured to harness 80 for maintaining exploder 10 during movement through the body of water at a proper angle of tow.

OPERATION OF PREFERRED EMBODIMENT

In the operation of the preferred embodiment shown in FIG. 1, exploder 10 is placed in position in the body of water and is towed by a seismic boat (not shown). The oxidizer and fuel valves 56 and 58 are then properly adjusted. The mixing chamber 50 thoroughly mixes the incoming fuel and oxidizer gases and sends them through port 60 into combustion chamber 40.

The combustion of the mixed gases is initiated by spark plug 62 and results in a rapid expansion of sleeve 12 against the surrounding hydrostatic pressure. Sleeve 12 stretches from its collapsed condition 64 to its fully extended position 66. The excursion or displacement "t" of sleeve 12 from its position 64 to its position 66 sends an acoustic wave into the surrounding water. This wave which has a predominant frequency of useful energy becomes reflected from various earth layers lying underneath the bottom surface of the water body. The various reflections are detected by suitable detectors in a seismic cable towed by the seismic boat in a conventional manner.

While exploder 10 is being towed, a substantial amount of water flows through tubes 30 and inner volume 42 of core 35. The waterflow through tubes 30 cools combustion chamber 40. The added cooling obtained from the flow of water through core 35 speeds the contraction of the gaseous combustion products in the combustion chamber and hence reduces the duration of the generated acoustic impulses This shortening of the pulse duration is otherwise rather difficult to achieve by known techniques. Shorter pulse durations result in an improved seismic energy frequency spectrum, as will be familiar to those skilled in the art.

An embodiment using a symmetrical arrangement of mixing chambers at both ends of exploder 10 is shown in FIG. 4, where symmetrical parts are designated with like numerals distinguished by a prime. In both FIGS. 1 and 4, core 35 could be made solid or hollow. In FIG. 4 it is solid and the cooling effect is produced only by tubes 30.

The operation of the embodiment shown in FIG. 4 is in all respects similar to the embodiment shown in FIG. 1, and no further description is believed to be necessary.

As previously mentioned, the exploder of the present invention allows the user to control and improve the seismic energy frequency spectrum of gas exploders generally and especially of known AQUAPULSE sources. This can be illustrated with the aid of the plot shown in FIG. 3, where a quantity $E$, characteristic of the seismic acoustic energy generated, is plotted on the $y$-axis, and frequency of the energy in Hertz is plotted on the $x$-axis. For an exploder having a linear dimension $L$ (say the unclamped length of sleeve 12), a typical energy-versus-frequency curve Z is shown. It will be noted that the peak or "dominant" energy is associated with an acoustic energy having a frequency of approximately 20 Hertz. If now the length of the same exploder were doubled to 2, the output seismic energy-versus-frequency curve would be W. It will be noted that the dominant energy is now associated with a frequency of approximately 10 Hertz, or half or curve Z. In general, the dominant frequency is substantially inversely proportional to the linear dimension for an exploder of the type shown in FIG. 1.

In accordance with this invention, it is possible to build relatively long exploders and yet keep the volume of the combustion chamber 40 within reasonable limits. This will be demonstrated by table I where a first exploder is assumed to have dimensions $L$ and $D$ and a second exploder the same dimensions increased by a factor of 1.5. It is also assumed that the same excursion or absolute displacement distance $t$ of sleeve 12 is retained in both instances.

TABLE I

| Parameters | Exploder No. 1 | Exploder No. 2 |
|---|---|---|
| Length of sleeve 12 | L | 1.5 L |
| Diameter of sleeve 12 | D | 1.5 D |
| Displacement | t | t |
| Volume of combustion chamber | V | $(1.5)^3$ V |
| Energy transfer | $E_t$ | $(1.5)^4 E_t$ |
| Dominant frequency | f | $1/1.5 f$ |

From table I it will be seen that without a center core Exploder No. 2 would have its combustion chamber volume increased by a factor of 3.375. To reduce the volume in Exploder No. 2 a center core 35 is inserted having, say, a volume of 1.375 V. Then the volume of the combustion chamber in Exploder No. 2 with a core would increase by a factor of 2. Hence, by only doubling the volume of the combustion chamber of Exploder No. 1, it is now possible to obtain substantially (1) double output detonation energy and (2) a shift of the energy-versus-frequency spectrum curve by a factor of 1/1.5 or 2/3. Both achievements are highly desirable.

In addition to being able to shift the predominant frequency of the output seismic energy without the concomitant increase in the combustion chamber volume, and hence in the volume of needed combustible gases, there is also obtained an improved energy transfer between source 10 and the surrounding water medium. This improved energy transfer is approximately proportional to the square of the area of the radiating surface for radiators of the character herein described. From table I it will be apparent that the energy transfer in Exploder No. 2 with a center core has been improved by a factor of 5.

What I claim is:

1. A seismic gas exploder for generating seismic energy comprising:

a housing having an expansible combustion and a wall defining a radiating surface area;

control means in said chamber for controlling the ratio of radiating surface area to combustion chamber volume support means within said wall and spaced apart from said control means to maintain said wall at a predetermined distance from said control means to form between said control means and said wall said combustion chamber;

supply means coupled with said chamber to supply a combustible gaseous mixture to said chamber;

ignition means to detonate said mixture within said chamber thereby producing gaseous products of combustion which cause said chamber to expand thereby causing said wall to radiate seismic energy and exhaust mans operatively coupled to said chamber and arranged to purge said products of combustion.

2. The gas exploder system of claim 1 wherein:

said control means is an open-ended core having a relatively large cross-sectional area, and said wall is a cylindrical elastic sleeve.

3. The gas exploder system of claim 2 wherein said support means includes a plurality of relatively small-diameter tubes positioned parallel to and at substantially the same distance from the longitudinal axis of said sleeve.

4. The gas exploder system of claim 3 wherein, said tubes are open-ended, said exploder is adapted to be moved through a body of water, and said water flows through said tubes and through said core during movement of said exploder through the body of water.

5. The gas exploder of claim 1 wherein said control means control the frequency of said radiated energy.

* * * * *